(12) United States Patent
Wooldridge et al.

(10) Patent No.: US 7,630,970 B2
(45) Date of Patent: Dec. 8, 2009

(54) WAIT TIMER FOR PARTIALLY FORMED QUERY

(75) Inventors: Andrew Wooldridge, Redwood City, CA (US); Swati Raju, San Jose, CA (US)

(73) Assignee: YAHOO! Inc., Sunnyvale, CA (US)

( * ) Notice: Subject to any disclaimer, the term of this patent is extended or adjusted under 35 U.S.C. 154(b) by 382 days.

(21) Appl. No.: 11/605,763

(22) Filed: Nov. 28, 2006

(65) Prior Publication Data
US 2008/0126308 A1 May 29, 2008

(51) Int. Cl.
G06F 17/30 (2006.01)
G06F 1/14 (2006.01)
G06F 13/00 (2006.01)

(52) U.S. Cl. ............................. 707/3; 707/102; 707/4; 707/5

(58) Field of Classification Search .................. 707/3
See application file for complete search history.

(56) References Cited

U.S. PATENT DOCUMENTS

| | | | |
|---|---|---|---|
| 5,913,215 A | 6/1999 | Rubinstein et al. | |
| 6,169,984 B1 * | 1/2001 | Bogdan | 707/3 |
| 6,169,986 B1 | 1/2001 | Bowman et al. | |
| 6,300,947 B1 | 10/2001 | Kanevsky | |
| 6,408,270 B1 | 6/2002 | Garber | |
| 6,587,850 B2 | 7/2003 | Zhai | |
| 6,640,218 B1 | 10/2003 | Golding et al. | |
| 6,985,898 B1 | 1/2006 | Ripley et al. | |
| 7,039,635 B1 | 5/2006 | Morgan et al. | |
| 7,181,438 B1 | 2/2007 | Szabo | |
| 2002/0035574 A1 * | 3/2002 | Dumas | 707/200 |
| 2002/0035673 A1 * | 3/2002 | Roseborough et al. | 711/129 |
| 2002/0152204 A1 | 10/2002 | Ortega et al. | |
| 2003/0061205 A1 * | 3/2003 | Cleghorn et al. | 707/3 |
| 2003/0101172 A1 | 5/2003 | De La Huerga | |
| 2003/0195877 A1 | 10/2003 | Ford et al. | |
| 2003/0234821 A1 | 12/2003 | Pugliese | |
| 2004/0021691 A1 | 2/2004 | Dostie et al. | |

(Continued)

FOREIGN PATENT DOCUMENTS

DE 102 35 548 A1 3/2002

(Continued)

OTHER PUBLICATIONS

PCT International Search Report and Written Opinion, PCT/US2006/031993, dated May 18, 2007, 10 pages.

(Continued)

Primary Examiner—Don Wong
Assistant Examiner—Binh V Ho
(74) Attorney, Agent, or Firm—Hickman Palermo Truong & Becker LLP

(57) ABSTRACT

In a system where a search query based on a partially formed query expression can be sent in a request to a server before the user finishes inputting the entire query expression, an intelligent mechanism is provided at a client of the server to prevent too many unnecessary requests from being sent to the server. In response to receiving, at the client, user input, the intelligent mechanism may determine whether a corresponding search query matches a key in the local search result cache. If so, local search results are displayed to the user. In addition, a timer may be used to delay sending the request to the server.

29 Claims, 3 Drawing Sheets

U.S. PATENT DOCUMENTS

| | | | |
|---|---|---|---|
| 2004/0090465 A1* | 5/2004 | Robertson et al. | 345/780 |
| 2004/0153963 A1 | 8/2004 | Simpson et al. | |
| 2004/0215654 A1* | 10/2004 | Eberwine et al. | 707/102 |
| 2004/0267730 A1 | 12/2004 | Dumais et al. | |
| 2005/0024418 A1* | 2/2005 | Yoshiyama | 347/19 |
| 2005/0192944 A1* | 9/2005 | Flinchem | 707/3 |
| 2005/0262059 A1* | 11/2005 | White | 707/3 |
| 2005/0283468 A1* | 12/2005 | Kamvar et al. | 707/3 |
| 2005/0288959 A1 | 12/2005 | Eraker et al. | |
| 2006/0064411 A1 | 3/2006 | Gross et al. | |
| 2006/0074680 A1* | 4/2006 | Cross et al. | 704/270 |
| 2006/0075120 A1* | 4/2006 | Smit | 709/227 |
| 2006/0173822 A1 | 8/2006 | Watson et al. | |
| 2006/0190436 A1 | 8/2006 | Richardson et al. | |
| 2006/0206454 A1 | 9/2006 | Forstallet et al. | |
| 2006/0259479 A1* | 11/2006 | Dai | 707/4 |
| 2006/0287980 A1 | 12/2006 | Liu et al. | |
| 2007/0005346 A1* | 1/2007 | Ueda et al. | 704/200 |
| 2007/0022299 A1* | 1/2007 | Yoshimura | 713/183 |
| 2007/0055652 A1* | 3/2007 | Hood et al. | 707/3 |
| 2007/0162422 A1* | 7/2007 | Djabarov | 707/2 |
| 2007/0226198 A1 | 9/2007 | Kapur | |
| 2008/0066017 A1 | 3/2008 | Hall et al. | |
| 2008/0077558 A1 | 3/2008 | Lawrence et al. | |
| 2008/0109401 A1* | 5/2008 | Sareen et al. | 707/3 |

FOREIGN PATENT DOCUMENTS

| | | |
|---|---|---|
| DE | 102 35 548 A1 | 10/2003 |
| EP | 0530 993 A2 | 3/1993 |
| EP | 1 006 704 A2 | 6/2000 |
| EP | 1 031 913 A2 | 8/2000 |
| EP | 1 408 674 A2 | 4/2004 |
| WO | WO 99/66427 | 12/1999 |
| WO | WO 99/66427 A1 | 12/1999 |
| WO | WO 01/80070 A | 10/2001 |
| WO | WO 2004/073286 | 8/2004 |
| WO | WO 2004/073286 A | 8/2004 |
| WO | WO 2004/073286 A2 | 8/2004 |

OTHER PUBLICATIONS

PCT International Search Report and Written Opinion, PCT/US2006/032255, dated May 16, 2007, 11 pages.

PCT International Search Report and Written Opinion, PCT/US2006/032243, dated May 16, 2007, 12 pages.

R. Baeza-Yates, et al., "Modern Information Retrieval, Chapter 5, Query Operations", Modern International Retrieval, Harlow: Addison-Wesley, GB, 1999, pp. 117-139, XP0022311981, ISBN: 0-201-39829-X.

"Communication Pursuant to Article 94(3) EPC" received in European case 06801807.6 dated Jun. 6, 2008, 3 pages.

FireFox Google search page, http://www.google.com/firefox?client=firefox-a&rls=org.mozilla:en-US:official, 1 page.

International Searching Authority, "Notification of Transmittal of The International Search Report and The Written Opinion of The International Searching Authority, or The Declaration", PCT/US2006/047543, dated May 30, 2007, 12 pages.

Claims, PCT/US2006/047543, 3 pages.

Yates, R et al., "Query Operations", XP-002311981, Chapter 5, 1999, pp. 117-139.

Schurman, Kyle, "Microsoft Money 2005 Premium, Introducing Microsoft Money 2005", Smart Computing Website, vol. 16, Issue 2, Feb. 2005, 3 pages.

"Communication pursuant to Article 94(3) EPC" received in Application No. 06 801 807.6—2201 dated Mar. 26, 2009 (7 pages).

Current Claims of 06 801 807.6 -2201 dated May 9, 2008 (3 pages).

* cited by examiner

WAIT TIMER FOR PARTIALLY FORMED QUERY

FIELD OF THE INVENTION

This application is related to U.S. patent application Ser. No. 11/430,487 ("ALTERNATIVE SEARCH QUERY PREDICTION"), filed by RICHARD KASPERSKI et al. on May 8, 2006; U.S. patent application Ser. No. 11/430,488 ("BIASING QUERIES TO DETERMINE SUGGESTED QUERIES"), filed by RICHARD KASPERSKI et al. on May 8, 2006; U.S. patent application Ser. No. 11/519,563, entitled "DISPLAYING ITEMS USING A REDUCED PRESENTATION", filed by ASHLEY WOODMAN HALL et al. on Sep. 11, 2006. The entire contents of these applications are hereby incorporated by reference for all purposes as if fully set forth herein.

The present invention relates to supporting interaction between a client and a server and in particular, to determining a time for the client to send a search query based on a partially formed query to the server.

BACKGROUND OF THE INVENTION

A search engine is a computer program that helps a user to locate information. The search engine can be communicatively linked to one or more clients. A user at a client can enter a searchable text and obtain from the search engine a list of results that match search criteria contained in the searchable text. While search engines may be applied in a variety of contexts, search engines are especially useful for locating results that are accessible through the Internet. Results that may be located through a search engine include, for example, files whose content is composed in a page description language such as Hypertext Markup Language (HTML). Such files are typically called pages. One can use a search engine to generate a list of Universal Resource Locators (URLs) and/or HTML links to files, or pages, that are likely to be of interest.

The search engine typically has an interface at a client (e.g., a personal computer) that allows a user to specify search criteria and displays search results to the user. In a typical scenario involving a client and a search engine, the interaction between the two is monolithic. That is, a user types in a searchable text and, when finished, submits the searchable text to the search engine in a request. In response, the search engine returns the search results relating to the searchable text to the client for displaying to the user.

Some systems provide a user with speculative search results before the search criteria have been fully formulated and submitted. As the user types, the client can send partially formed search criteria to the search engine. The search engine then sends back speculative search results to the client for presentation. As the user continues the input, the previous speculated search results may be invalidated; more partially formed search criteria are sent to the search engine. In response, the search engine sends back new rounds of speculative results to the client for presentation. This continues until the user locates a desired result or otherwise terminates the search.

A disadvantage of these techniques is that many requests for speculative search results can be potentially sent to a search engine as a user types. The problem is further aggravated if the user types fast and/or inputs a long search text.

Thus, a need exists for improved ways of supporting interaction between a client and a search engine.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
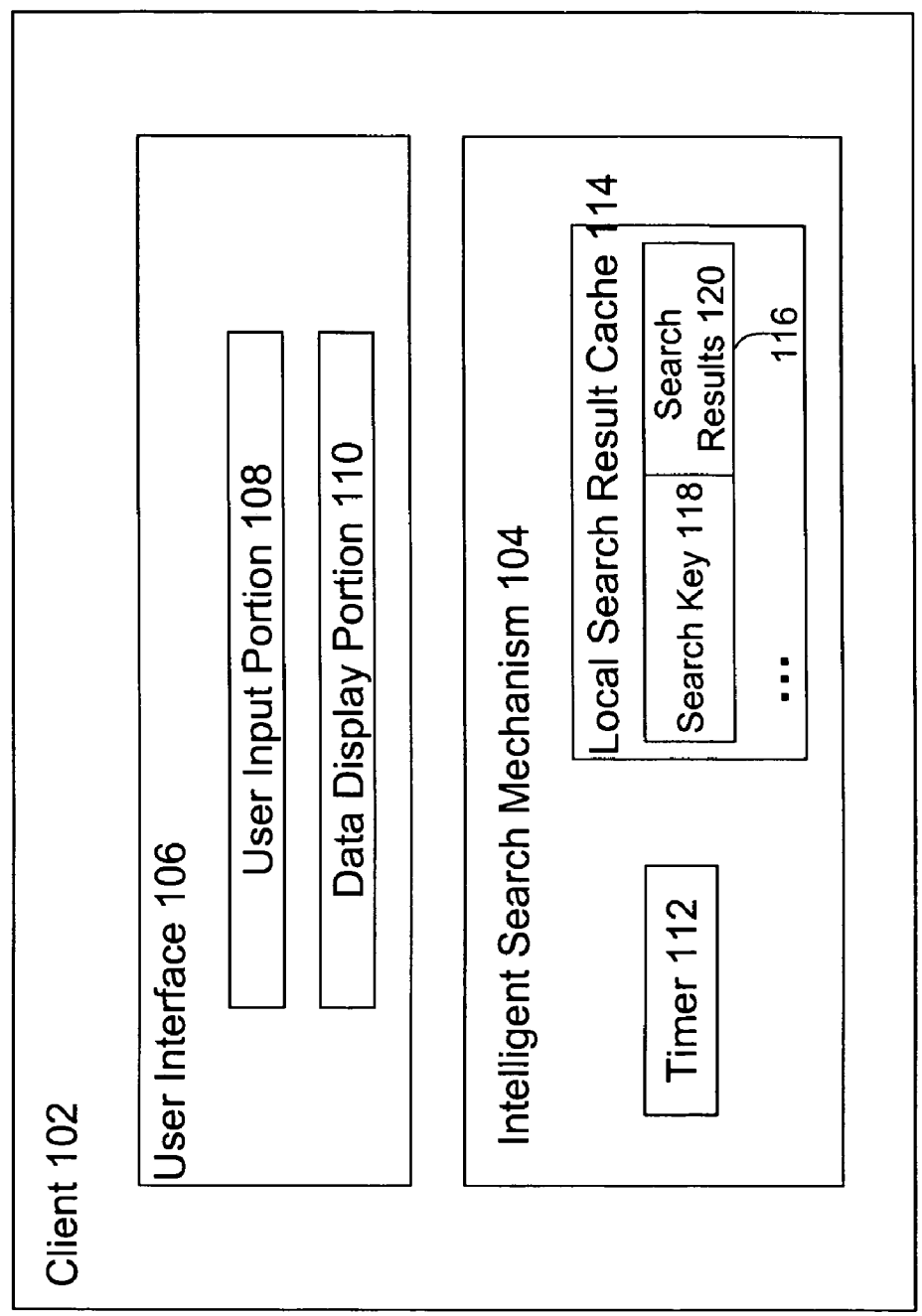
FIG. 1 illustrates a system, according to an embodiment of the present invention.

A method and apparatus for supporting interaction between a client and a search engine is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

In accordance with an embodiment of the present invention, a partially entered searchable text (user input) can be used to establish a search query. The search query is referred to herein as a suggested query completion. As used herein, the phrase "a partially entered searchable text" includes a searchable text that may or may not have been submitted by a user to a search engine. In one embodiment, the search query may be the user input itself. In another embodiment, the search query may be a suggested query identified from one or more suggestions.

A request containing the suggested query completion may be sent to a search engine to retrieve search results that match the search query. The sending of the request to the search engine may occur before the user finishes with entering the whole searchable text, but may be delayed by a timer after the most recently entered character is received.

Once the request is received, the search engine retrieves search results based on the search query contained in the request and returns the search results to the client. As used herein, the term "a search engine" may refer to a group of search engines that are accessible at a common location. Such a common location, for example, may be specified by the user using a qualifier such as a common URL prefix. Furthermore, the term "a search engine" also refers to any search engine to which a search request destined to a particular location has been redirected to a different location, for example, in a load-balancing scheme.

In accordance with an embodiment of the present invention, an intelligent mechanism that implements a local search result cache and a wait timer is provided at a client of a search engine to prevent too many unnecessary requests containing search queries from being sent to a search engine. The term "a client of a search engine" may refer to an electronic device that accesses a search engine or a group of search engines at a common location from a user's perspective. This intelligent mechanism may be implemented as a part of browser software that resides on the client or as a part of logic embedded in a search page downloaded from a server (which may or may not host the search engine) to the client.

According to one embodiment, the local search result cache contains one or more keys and search results associated with each of the one or more search keys. In one embodiment, each search key in the local search result cache is a search query (which may be a prior suggested query completion) that was contained in a previous request for search results. Search results associated with a key were returned in a response to a previous request that contained the key as a search query. In some embodiments, the local search result cache may be preloaded before the user initiates a present search session. In some embodiments, the local search result cache may be populated by prior speculative search queries from prior sessions.

In one embodiment, the suggested query completion may be a suggestion that is based on the user input. In response to receiving user input comprising one or more characters at the client, but before a request containing any search query is sent to the search engine, the intelligent mechanism at the client first retrieves one or more suggestions that are deemed as matching the present user input. The one or more suggestions may be retrieved from a query suggestion server located remotely from the client. For example, the client may send a request containing the present user input to the query suggestion server. In response, the query suggestion server speculates on what a user query might be related to the present user input received. The query suggestion server may come up with one or more suggestions as to what the user query might be when completed by the user and return the suggestions to the client. Alternatively, the one or more suggestions may be retrieved from a local suggestion cache. The local suggestion cache may comprise suggestion keys and suggestions associated with the suggestion keys. Thus, even before a request for suggestions is sent to the query suggestion server, the intelligent mechanism may determine whether the present user input matches a suggestion key stored in the local suggestion cache. If so, the intelligent mechanism directly retrieves the suggestions corresponding to the suggestion key from the local suggestion cache. Both methods of obtaining suggestions based on the user input may be used in alternative or in combination.

In any event, when the intelligent mechanism receives the one or more suggestions from either the local suggestion cache or the query suggestion server, the intelligent mechanism may identify one of the suggestions as a suggested query completion.

In one embodiment, the suggested query completion may be the user input itself. Thus, in this embodiment, the intelligent mechanism may skip the step of retrieving suggestions from a query suggestion server or the local suggestion cache.

Once the suggested query completion is identified, the intelligent mechanism determines whether it matches a search key in the local search result cache. If so, search results corresponding to the suggested query completion are retrieved. A part, or the whole, of the search results retrieved is displayed to the user. In one embodiment, before displaying any search results, freshness of the search results is determined. In such an embodiment, those search results that are deemed as stale are not displayed to the user. In one embodiment, once deemed as stale, the search key and the search results are removed from the local search result cache.

If no search results from the local search result cache are found for the suggested query completion, the intelligent mechanism sets a timer, which is scheduled to go off after a first time interval. The timer is used to delay sending a request containing the suggested query completion to a search engine.

In one embodiment, whether the timer should be set is dependent on the most recently received character—say a particular character—of the user input. In one embodiment, if it is determined that the particular character is a part of a cut-and-paste action, then, in response, the timer will not be set (i.e., is determined not to be set). In that embodiment, a request to containing the search query is immediately sent to the search engine. Likewise, if it is determined that the particular character (e.g., a carriage return) signifies a submission of the user input as a search query by the user, then, in response, the timer does not need to be set (i.e., is determined not to be set).

However, if it is determined that a timer should be set, according to one embodiment, how long a time interval that is associated with the timer (i.e., the first time interval) should be set may depend on what the most recently entered character (i.e., the particular character) is. For example, a time interval for a backspace character may be set to be longer than a time interval for an alphanumeric character such as "A". In one embodiment, the first time interval for a backspace character is set to be twice as long as the first time interval for an alphanumeric character. In response to a determination that a timer should be set, a timer is set to be scheduled to go off after a first time interval.

After setting the timer, the intelligent mechanism waits for new input from the user and determines whether the timer goes off prior to receiving a new character of user input. If the timer goes off before a new character is received, the intelligent mechanism determines whether to send a request to the search engine for search results that match the suggested query completion. Such a request would be for search results that match a search query that is based on the user input that includes the particular character. In one embodiment, once the timer goes off without a new character input, the intelligent mechanism always determines to send the request to the search engine for search results that match the suggested query completion.

As described earlier, a local search result cache may be consulted before it is decided whether a timer should be set to delay sending a request to a search engine. In an alternative embodiment, such consultation is instead performed after the timer goes off without receiving a new character. In that scenario, before the request to the search engine is actually sent, the intelligent mechanism determines whether the user input matches a search key stored in a local search result cache in the similar manner as previously described. If a match is found in the local search result cache, and if search results therein associated with the matching key is fresh enough, the intelligent mechanism foregoes sending the request containing the suggested query completion to the search engine. Instead, the intelligent mechanism retrieves the search results associated with the matching key and displays the search results to the user. On the other hand, in response to a determination that the suggested query completion does not match any keys stored in a local search result cache, the intelligent mechanism would determine whether to send a request to a search engine for search results that match the suggested query completion.

If the timer does not go off prior to receiving a new character of user input, then, in response, the intelligent mechanism identifies a new suggested query completion that is based on the user input that includes the new character and, if necessary (e.g., where no search results can be found in the local search cache that correspond to the new suggested query completion), re-sets the timer so that the timer is rescheduled to go off after a new time interval. Like the first time internal, how long this new time interval should be set depends on the most recently received character, i.e., the new character. Thereafter, the intelligent mechanism again determines whether the timer goes off prior to receiving a second new character of user input, and in response to a determination that the timer goes off prior to receiving a second new character of user input, determines whether to send a request to a search engine based on a query suggestion for the user input that includes the particular character and the new character. This process continues until the user finishes the present search session. Under this approach, a request for search results is typically not immediately sent to the search engine as the user types. Consequently, a request that would be invalidated by newly entered character(s) before the timer goes off would not be sent to the search engine.

The user input and search results as described herein may pertain to the World Wide Web. However, this invention is not so limited. More generally, the user input and results may pertain to any searchable data in any format. For example, the user input may comprise keystrokes with a keyboard, data input through a keypad, moves made with a game device, writing on a pen-based system, contacts on a touch-sensitive screen, etc. Furthermore, the data may be a user's address book, saved links, personally stored images (such as .jpeg files, .gif files, etc.), video, audio (.mp3 files, .wmv files, etc.), contact cards (e.g., v-cards), calendar objects, word processing documents, graphics files, or computer code (object files and source code).

EXAMPLE EMBODIMENTS

According to one embodiment, as shown in FIG. 1, a system 100 comprises a client 102, a suggestion engine (not shown) and a search engine (not shown). The client 102 is a computing device that comprises an intelligent mechanism 104 and a user interface 106. In another embodiment, the user interface 106 may be a display screen attached locally or communicatively linked to the computing device. For example, the user interface 106 may be provided by a monitor attached to the computing device locally. Alternatively, the user interface 106 may be provided by a monitor attached to a remote computer that communicatively linked to the computing device (for example via Virtual Private Network). The user interface includes a user input portion 108 and a data display portion 110. The user input portion 108 displays what has been inputted by a user through an input means. To provide user input (e.g., one or more characters) to the client 102, the user may use any input means such as a keyboard, keypad, a writing surface, a touch screen, etc.

The intelligent mechanism 104 implements a timer 112, which may be used to delay sending a request containing a search query to the search engine. For example, the intelligent mechanism 104 may decide that at a given time it is not necessary to send a request containing a search query that is based on the present user input, but rather should be delayed until after a certain time interval. To do so, the intelligent mechanism 104 may set the timer 112 so that it goes off after the certain time interval. When the timer 112 does go off, the intelligent mechanism 104 may then send the request to the search engine.

The time interval—between a time when the timer 112 is set by the intelligent mechanism 104 and a time when the timer 112 is scheduled to go off—can be altered at any time by the intelligent mechanism 104. For example, if by a previous setting the timer 112 were scheduled to go off after a first time interval, say 360 milliseconds, from a time A, then, at a time B, the intelligent mechanism 104 may re-set the timer 112 to go off after a second time interval, say 700 milliseconds, from the time B, whether the time B is after a first time interval from the time A (i.e., the timer has gone off by the previous setting) or not (i.e., the timer has not gone off by the previous setting).

In an alternative embodiment, instead of using one timer with a repeatedly settable time interval, the intelligent mechanism 104 may use a series of timers; a subsequent timer with a new time interval is created to replace a prior timer which is either cancelled or expired. For example, if a previous timer 112 were scheduled to go off after a first time interval, say 360 milliseconds, from a time A, then, at a time B, the intelligent mechanism 104 may create a new timer 112 to go off after a second time interval, say 700 milliseconds, from the time B, whether the time B is after a first time interval from the time A (i.e., the previous timer has gone off) or not (i.e., the previous timer has not gone off). When the new timer 112 is created, if the previous timer has not gone off, the previous timer is cancelled.

Besides the timer or timers 112, additionally and optionally, the intelligent mechanism 104 implements a local search result cache 114. The local search result cache 114 comprises zero or more entries 116. Each entry 116 comprises a search key 118 and search results 120 associated therewith. This local search result cache 114, in combination with the timer or timers 112, enables the intelligent mechanism 104 to avoid sending to the search engine unnecessary requests. In one embodiment, the local search result cache 114 stores search results obtained in connection with a prior or ongoing search. For example, in a prior search, a search query based on the then user input has been sent to the search engine and search results relating to the search query have been received from the search engine by the client 102. Upon receiving the search results from the search engine, the intelligent mechanism 104 stores the search results in an entry with the searchable query as a (search) key. Thereafter, either at the time when a search query is identified because a new character (the most recent input character in the user input) is received, or at the time when a request for search results matching a search query is to be made to the search engine, the local search result cache data 114 can be checked first to see if search results associated with the search query can be found in the cache. This lookup can be made by comparing the search query with the search keys in the local search result cache 114. If a match is found, search results associated with the search query is retrieved from the local search result cache 114. In this way, the intelligent mechanism 104 avoids sending a request for search results every time a new character is received. In one embodiment, the intelligent mechanism 104 performs a freshness check on the search results retrieved from the local search result cache 114. Such a freshness check may be based on a policy. This policy may specify criteria based on types of data in the search results or sources of the data. For example, the policy may specify that any news older than 1 hour may be deemed as stale and cannot be used. On the other hand, the policy may specify, for instance, that a query for conference proceedings at an IEEE conference may be deemed always as fresh data.

In addition, in one embodiment, the local search result cache is preloaded with search results that may or may not be in connection with prior searches, prior to the current search session.

Example Operation

Figure 2:
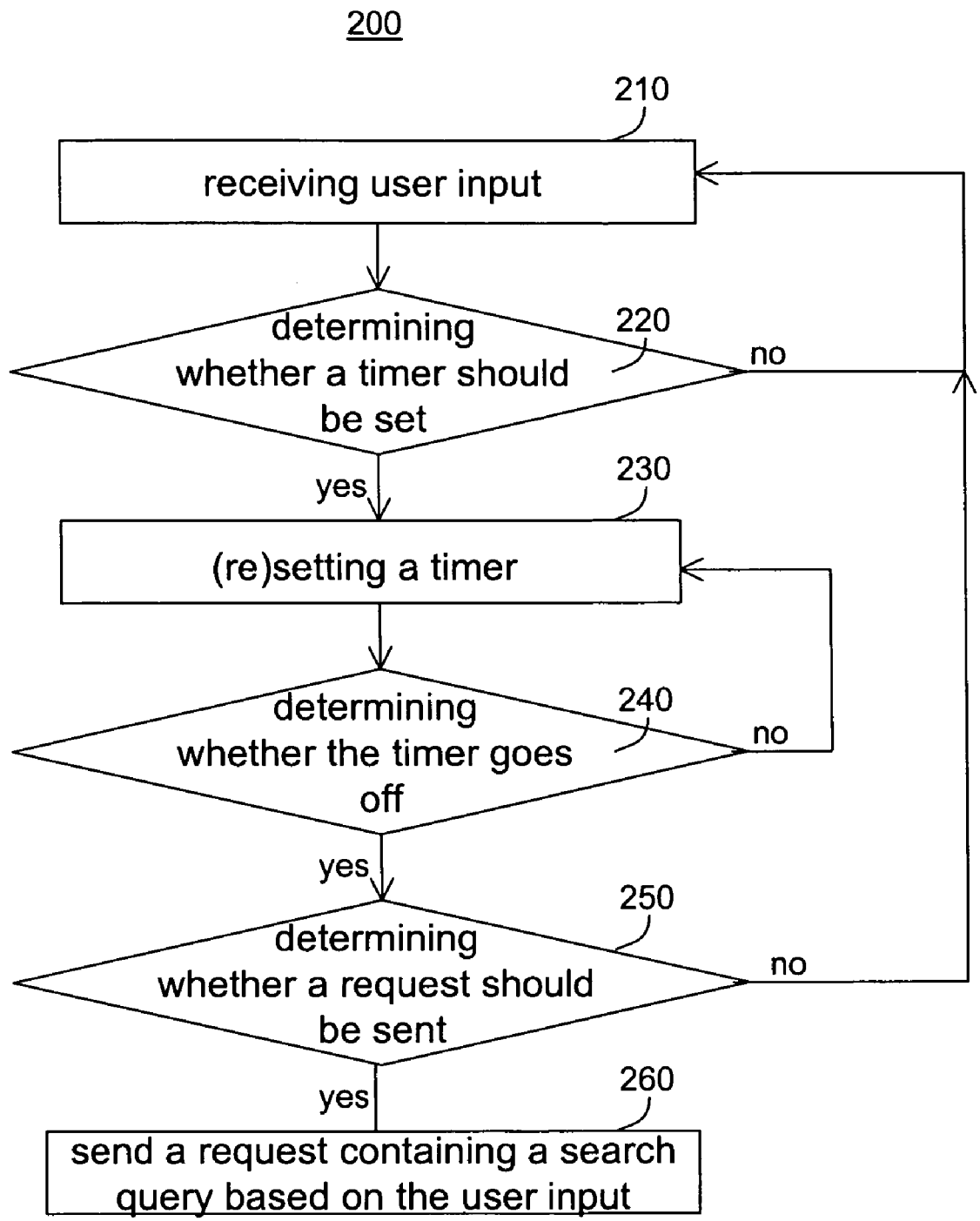
FIG. 2 is a flow diagram that illustrates a technique for supporting interaction between a client of a search engine and the search engine, according to an embodiment of the present invention.

FIG. 2 is a flow diagram that illustrates a process 200 for supporting interaction between a client (102 in FIG. 1) of a search engine and the search engine, according to an embodiment of the present invention.

At step 210, the intelligent mechanism (104 of FIG. 1) receives user input comprising one or more characters from a user. The user input is a partially formed searchable text comprising zero or more previously entered characters and a particular character. Here the particular character is the most recently received character of the user input. In one embodiment, the user input is displayed in the user input portion (108 of FIG. 1). Based on the present user input, a search query is established. In one embodiment, the search query is the user input itself. In another embodiment, the user input is used by the intelligent mechanism to retrieve suggestions from the query suggestion server. Additionally or alternatively, the user input may be used by the intelligent mechanism to retrieve suggestions from the local suggestion cache. One of the suggestions retrieved from either the query suggestion server or the local suggestion cache may be identified as the search query. In one embodiment, the partially formed searchable text should be at least N characters long, where N may be, for example, three, before the intelligent mechanism sends any request for search results to the search engine.

At step 220, in response to receiving the user input, the intelligent mechanism 104 determines whether a timer 112 should be set (or re-set). In one embodiment, in such a determination, the intelligent mechanism 104 first checks whether the search query determined previously matches a search key 118 of an entry 116 in the local search result cache 114. In some embodiments, a match is considered to be found if the search query meets some similarity criteria with a search key 118 in the local search result cache. If so, search results 120 relating to the search key 118 is retrieved and displayed to the user in the data display portion (110 of FIG. 1).

As noted before, in one embodiment, freshness of the search results 120 associated with the search query (or the key 118) is determined before the search results 120 are displayed to the user. In such an embodiment, the search results 120 that are deemed as stale are not displayed to the user. Furthermore, the entry 116 containing the search results 120 may be removed from the local search result cache 114 as a result of a determination that the search results 120 are stale.

If no data from the local search result cache 114 is found, then, in accordance with one embodiment of the present invention, the intelligent mechanism 114 further checks whether the particular character is a part of a cut-and-paste action. In one embodiment, the intelligent mechanism 104 listens for a user interface event or action associated with a cut-and-paste action. When such an event or action is detected, the intelligent mechanism 104 sends a request for search results to the search engine. The request contains the search query identified using the user input in its present state. In another embodiment, the intelligent mechanism 104 may treat any successive characters leading to the most recently entered character that are entered in a rapid succession as a cut-and-paste action. For example, if the most recently entered character is entered in less than a predetermined interval such as 1 millisecond, the intelligent mechanism 104 treats the most recently entered character as a part of a cut-and-paste action and thus sends a request to the search engine containing a search query based on the present user input without delaying.

In one embodiment, if no search results are found in the local search result cache 114 and if the most recently entered character is not a part of a cut-and-paste action, then the intelligent mechanism 104 further determines if the user has submitted the user input for query. This determination can be made by checking if the most recently entered character is an "enter" character, or if the user has clicked on a "submit" like button on the user interface, etc.

For the purpose of illustration, the determination whether a timer should be set after receiving the user input has been described as a sequence of checking the local search result cache 104, checking whether the most recently entered character is a part of a cut-and-paste action, and checking whether the user signifies a submission of the user input to the search engine. However, the present invention is not so limited. Any order of those steps or even any omission of the steps is within the scope of the present invention.

At step 230, in response to a determination that a timer 112 should be set, the intelligent mechanism 104 sets a timer. The timer 112 is scheduled to go off after a first time interval. As noted before, how long the first time interval should be set may depend on what the particular character is.

After setting the timer, at step 240, the intelligent mechanism 104 waits for new input (or a new character) from the user and determines whether the timer 112 goes off prior to receiving the new input (or the new character).

If the timer 112 does not go off prior to receiving a new character of user input, then, in response, the intelligent mechanism 104 re-sets the timer at step 230 so that the timer 112 is rescheduled to go off after a new time interval. Like the first time internal, how long this new time interval should be set depends on the most recently received character at the present time, i.e., the new character.

If the timer 112 goes off before a new character is received, the intelligent mechanism, at step 250, determines whether to send a request for search results that match the search query to a search engine such as a server communicatively linked to the client 102. The search query would be the same as the one identified prior to the setting of the timer that has gone off, as there is no new character is received. In one embodiment, once the timer 112 goes off without a new character input, the intelligent mechanism 104 always determines to send the request containing the search query at step 260.

However, as described earlier, in one embodiment, the local search result cache 114 may be consulted before the request to the search engine is actually sent. The intelligent mechanism 104 determines whether the search query matches a search key 118 in an entry 116 stored in the local search result cache 114. If a matching key 118 is found in the cache 114, and if search results 120 associated with the matching key 118 is fresh enough, the intelligent mechanism 104 foregoes sending the request containing the search query to the search engine. Instead, the intelligent mechanism 104 retrieves the search results 120 associated with the matching key 118 and displays the search results 120 to the user.

Now, if the timer 112 does not go off prior to receiving a new character of user input, then, in response, the intelligent mechanism 104 re-sets the timer 112 so that the timer 112 is rescheduled to go off after a new time interval. Like the first time internal, how long this new time interval should be set depends on the (new) most recently received character, i.e., the new character. Thereafter, the intelligent mechanism again determines whether the timer goes off prior to receiving a second new character of user input (at step 230), and in response to a determination that the timer 112 goes off prior to receiving a second new character of user input, determines whether to send a request to a search engine for search results that match a search query; and the search query here will be based on the user input that includes the particular character and the new character. This process that prevents unnecessary request sending continues until the user finishes the present search session.

Hardware Overview

Figure 3:
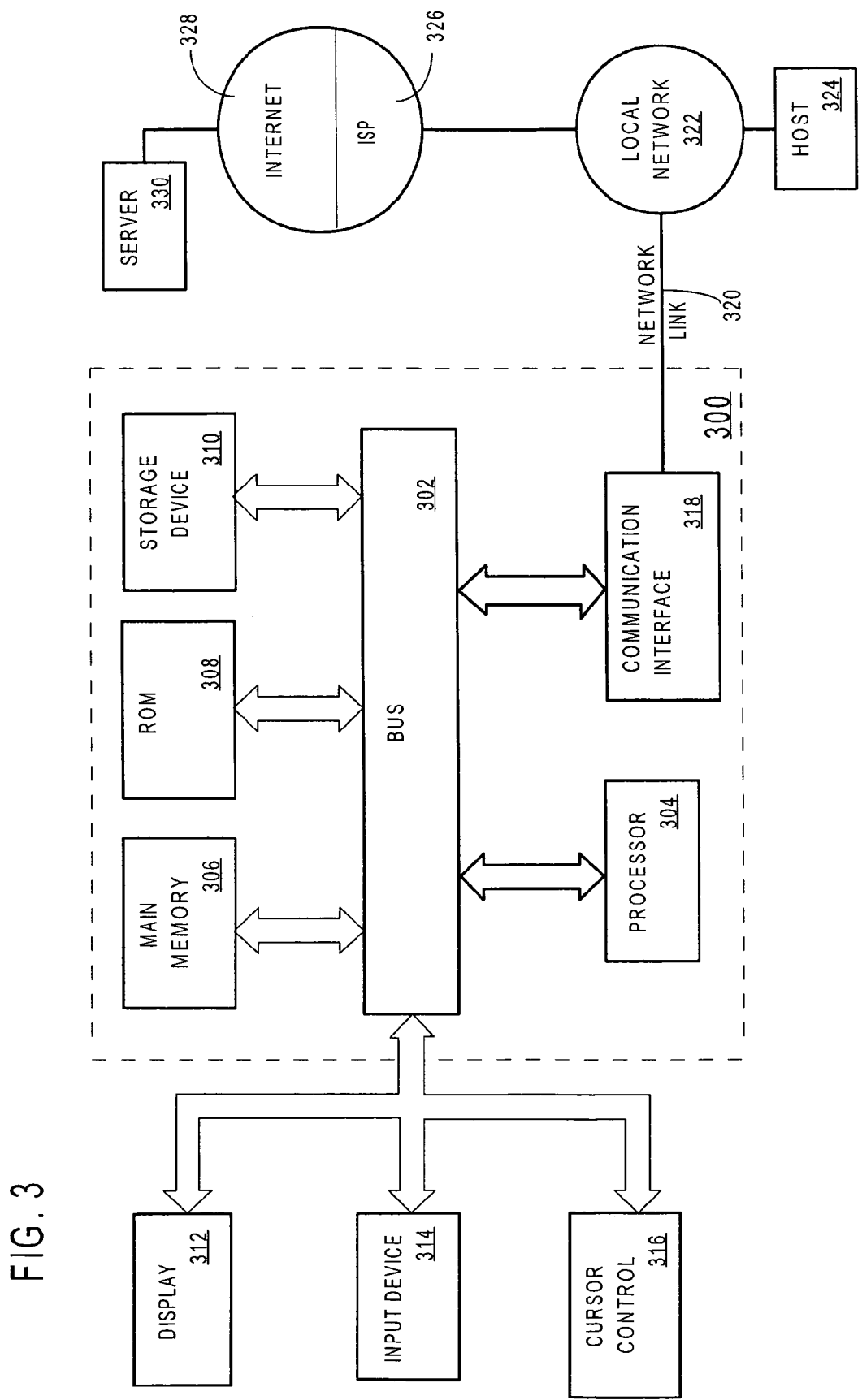
FIG. 3 is a block diagram that illustrates a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may be used to implement the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

receiving, at a client, user input comprising one or more characters;

in response to receiving a most recently received character of the one or more characters, determining whether a first timer is to be set based, at least in part, on what particular character the most recently received character is;

in response to a determination that the first timer is to be set, performing the steps of:

setting the first timer, wherein the first timer is scheduled to go off after a first time interval;

determining whether the first timer goes off prior to receiving a new character of user input; and in response to a determination that the first timer goes off prior to receiving a new character of user input, determining whether to send a request to a server for search results that match a search query that is based on the user input that includes the one or more characters;

in response to receiving a new character of user input before the first timer has none off, determining whether a second timer is to be set based, at least in part, on what particular character the new character is;

in response to a determination that the second timer is to be set, performing:

setting the second timer, wherein the second timer is scheduled to go off after a new time interval;

determining whether the second timer goes off prior to receiving a second new character of user input; and in response to a determination that the second timer goes off prior to receiving the second new character of user input, determining whether to send a request to a server for search results that match a search query that is based on the user input that includes the new character;

wherein the method is performed by one or more computing devices.

2. A method as recited in claim 1, wherein receiving user input comprising one or more characters further comprises:

determining whether the one or more characters match a suggestion key stored in a local suggestion cache;

in response to a determination that the one or more characters match a suggestion key stored in a local suggestion cache, identifying one of one or more suggestions in the local suggestion cache that are associated with the suggestion key as the search query.

3. A method as recited in claim 1, wherein receiving user input comprising one or more characters further comprises:

determining whether the one or more characters match a suggestion key stored in a local suggestion cache;

in response to a determination that the one or more characters do not match a suggestion key stored in a local suggestion cache, requesting and receiving one or more suggestions from a suggestion server; and identifying one of the one or more suggestions from the suggestion server as the search query.

4. A method as recited in claim 1, wherein determining whether to send a request to a server comprises always determining to send a request to a server for search search results that match a search query that is based on the user input that includes the one or more characters.

5. A method as recited in claim 1, wherein determining whether to send a request to a server comprises:

determining whether the search query matches a search result key stored in a local search result cache; and in response to a determination that the search query does not match a search result key stored in a local search result cache, determining to send a request to a server for search results that match the search query.

6. A method as recited in claim 1, wherein determining whether to send a request to a server comprises:

determining whether the search query matches a search result key stored in a local search result cache; and in response to a determination that the search query matches a search result key stored in a local search result cache, determining not to send a request to a server for search results that match the search query.

7. A method as recited in claim 6, further comprising, in response to determining not to send a request to a server, retrieving search results from the search result cache that are associated with the search result key.

8. A method as recited in claim 1, wherein the first time interval depends on the one or more characters.

9. A method as recited in claim 1, wherein the new time interval depends in part on the new character.

10. A method as recited in claim 1, wherein determining whether a first timer is to be set further comprises:

determining whether the most recently received character is a part of a cut-and-paste action; and in response to a determination that the most recently received character is a part of a cut-and-paste action, determining not to set the first timer.

11. A method as recited in claim 1, wherein determining whether a first timer is to be set further comprises:

determining whether the most recently received character signifies a submission; and in response to a determination that the most recently received character signifies a submission, determining not to set the first timer.

12. An apparatus for querying a search engine, comprising:

a network interface that is coupled to a data network for communication;

one or more processors;

one or more stored sequences of instructions which, when executed by the one or more processors, cause the one or more processors to carry out the steps of:

receiving, at a client, user input comprising one or more characters;

in response to receiving a most recently received character of the one or more characters, determining whether a first timer is to be set based, at least in part, on what particular character the most recently received character is;

in response to a determination that the first timer is to be set, performing the steps of:

setting the first timer, wherein the first timer is scheduled to go off after a first time interval;

determining whether the first timer goes off prior to receiving a new character of user input; and in response to a determination that the first timer goes off prior to receiving a new character of user input, determining whether to send a request to a server for search results that match a search query that is based on the user input that includes the one or more characters;

in response to receiving a new character of user input before the first timer has gone off, determining whether a second timer should is to be set based, at least in part, on what particular character the new character is;

in response to a determination that the second timer is to be set, performing:
  setting the second timer, wherein the second timer is scheduled to go off after a new time interval;
  determining whether the second timer goes off prior to receiving a second new character of user input; and in response to a determination that the second timer goes off prior to receiving the second new character of user input, determining whether to send a request to a server for search results that match a search query that is based on the user input that includes the new character.

13. A volatile or non-volatile computer-readable medium having one or more stored sequences of instructions which, when executed by the one or more processors, cause the one or more processors to carry out the steps of:

receiving, at a client, user input comprising one or more characters;

in response to receiving a most recently received character of the one or more characters, determining whether a first timer is to be set based, at least in part, on what particular character the most recently received character is;

in response to a determination that the first timer is to be set, performing the steps of:
  setting the first timer, wherein the first timer is scheduled to go off after a first time interval;
  determining whether the first timer goes off prior to receiving a new character of user input; and in response to a determination that the first timer goes off prior to receiving a new character of user input, determining whether to send a request to a server for search results that match a search query that is based on the user input that includes the one or more characters;

in response to receiving a new character of user input before the first timer has none off, determining whether a second timer is to be set based, at least in part, on what particular character the new character is;

in response to a determination that the second timer is to be set, performing:
  setting the second timer, wherein the second timer is scheduled to go off after a new time interval;
  determining whether the second timer goes off prior to receiving a second new character of user input; and in response to a determination that the second timer goes off prior to receiving the second new character of user input, determining whether to send a request to a server for search results that match a search query that is based on the user input that includes the new character.

14. A medium as recited in claim 13, wherein the one or more stored sequences of instructions further comprise instructions which, when executed by the one or more processors, cause the one or more processors to carry out:
determining whether the one or more characters match a suggestion key stored in a local suggestion cache;

in response to a determination that the one or more characters match a suggestion key stored in a local suggestion cache, identifying one of one or more suggestions in the local suggestion cache that are associated with the suggestion key as the search query.

15. A medium as recited in claim 13, wherein the one or more stored sequences of instructions further comprise instructions which, when executed by the one or more processors, cause the one or more processors to carry out:
determining whether the one or more characters match a suggestion key stored in a local suggestion cache;
in response to a determination that the one or more characters do not match a suggestion key stored in a local suggestion cache, requesting and receiving one or more suggestions from a suggestion server; and
identifying one of the one or more suggestions from the suggestion server as the search query.

16. A medium as recited in claim 13, wherein the one or more stored sequences of instructions further comprise instructions which, when executed by the one or more processors, cause the one or more processors to carry out always determining to send a request to a server for search results that match a search query that is based on the user input that includes the one or more characters.

17. A medium as recited in claim 13, wherein the one or more stored sequences of instructions further comprise instructions which, when executed by the one or more processors, cause the one or more processors to carry out:
determining whether the search query matches a search result key stored in a local search result cache; and
in response to a determination that the search query does not match a search result key stored in a local search result cache, determining to send a request to a server for search results that match the search query.

18. A medium as recited in claim 13, wherein the one or more stored sequences of instructions further comprise instructions which, when executed by the one or more processors, cause the one or more processors to carry out:
determining whether the search query matches a search result key stored in a local search result cache; and
in response to a determination that the search query matches a search result key stored in a local search result cache, determining not to send a request to a server for search results that match the search query.

19. A medium as recited in claim 18, wherein the one or more stored sequences of instructions further comprise instructions which, when executed by the one or more processors, cause the one or more processors to carry out, in response to determining not to send a request to a server, retrieving search results from the search result cache that are associated with the search result key.

20. A medium as recited in claim 13, wherein the first time interval depends on the one or more characters.

21. A medium as recited in claim 13, wherein the new time interval depends in part on the new character.

22. A medium as recited in claim 13, wherein the one or more stored sequences of instructions further comprise instructions which, when executed by the one or more processors, cause the one or more processors to carry out:
determining whether the most recently received character is a part of a cut-and-paste action; and
in response to a determination that the most recently received character is a part of a cut-and-paste action, determining not to set the first timer.

23. A medium as recited in claim 13, wherein the one or more stored sequences of instructions further comprise instructions which, when executed by the one or more processors, cause the one or more processors to carry out:

determining whether the most recently received character signifies a submission; and in response to a determination that the most recently received character signifies a submission, determining not to set the first timer.

24. A method as recited in claim 1, wherein the first timer and the second timer are implemented by a same timer.

25. A method as recited in claim 1, wherein the first timer and the second timer are implemented by different timers.

26. An apparatus as recited in claim 12, wherein the first timer and the second timer are implemented by a same timer.

27. An apparatus as recited in claim 12, wherein the first timer and the second timer are implemented by different timers.

28. A medium as recited in claim 13, wherein the first timer and the second timer are implemented by a same timer.

29. A medium as recited in claim 13, wherein the first timer and the second timer are implemented by different timers.

* * * * *

UNITED STATES PATENT AND TRADEMARK OFFICE
CERTIFICATE OF CORRECTION

PATENT NO. : 7,630,970 B2
APPLICATION NO. : 11/605763
DATED : December 8, 2009
INVENTOR(S) : Andrew Wooldridge et al.

It is certified that error appears in the above-identified patent and that said Letters Patent is hereby corrected as shown below:

Column 13

Claim 12: Line 8: Delete "should".

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,630,970 B2
APPLICATION NO. : 11/605763
DATED : December 8, 2009
INVENTOR(S) : Wooldridge et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 392 days.

Signed and Sealed this

Twenty-first Day of December, 2010

David J. Kappos
*Director of the United States Patent and Trademark Office*